United States Patent Office 3,813,347
Patented May 28, 1974

3,813,347
MANUFACTURE OF ADSORBENT COMPOSITE
Charles M. Hayes, Hoffman Estates, Ill., assignor to Universal Oil Products Company, Des Plaines, Ill.
No Drawing. Continuation-in-part of abandoned application Ser. No. 78,291, Oct. 5, 1970. This application Dec. 17, 1971, Ser. No. 209,406
Int. Cl. B01j
U.S. Cl. 252—428          9 Claims

ABSTRACT OF THE DISCLOSURE

The method of preparing an adsorbent composite which comprises precoating an adsorbent with an inert removable shielding liquid, thereafter uniformly distributing the precoated adsorbent in a matrix and subsequently removing said shielding liquid from the composite. A specific embodiment comprises precoating carbon granules with Decalin, separately preparing a polyurethane formulation, adding the precoated carbon granules thereto, foaming the polyurethane formulation, and subsequently heating the composite in vacuum to remove the Decalin. In one embodiment, the final composite is especially useful to adsorb gasoline vapors from the carburetor and/or fuel system of an automobile and for the controlled desorption of the gasoline upon restarting the engine.

CROSS-REFERENCE TO RELATED APPLICATION

This is a continuation-in-part of copending application Ser. No. 78,291, filed Oct. 5, 1970, now abandoned.

BACKGROUND OF THE INVENTION

Solid adsorbent particles and particularly activated carbon particles are used in a variety of industries including, for example, chemical, petroleum, food, medical, pulping, water treating, etc. The adsorbent is used to recover valuable products from less valuable components, to separate a mixture of components into fractions, to purify a stream by removing impurities therefrom, etc. Activated carbon is used, for example, in the refining and decolorization of mineral, animal and vegetable oils; for the refining, decolorizing and purifying of sugar solutions, syrups such as those from cane, maple, corn and sorghum, glycerine and aqueous and non-aqueous solutions of organic and inorganic compounds; purification of water, and as a deodorant. Other uses include the purification of gelatins, phenols, medicinals, pharmaceuticals, and in the bleaching and purification of various crude and partly refined off-grade and off-flavored food and vegetable oils including, cottonseed, linseed, rapeseed, coconut, soya bean, etc., as well as animal oils and fats such as lard, fish oils, paint oils, varnishes, garage wastes, etc. Activated carbon granules also are used to separate diverse components for chromatographic analyses.

While the activated carbon particles are very useful for many purposes, difficulties are encountered in the handling and utilization thereof. The carbon granules undergo attrition during handling and this interferes with the ready transportation and shipping of the particles, as well as in a loss of the adsorbent. When the attrition occurs during use, this may result in channeling in and/or plugging of the contact zone, which interferes with the satisfactory operation of the adsorbent process. In addition, excess back pressure may develop in such operations.

A specific utilization of the carbon particles is directed to the reduction of air pollution. It has been proposed in the prior art to adsorb the gasoline vapors which emit from the carburetor of an automobile and also to adsorb the gasoline vapors which emit from the fuel tank. One method heretofore proposed is the use of a bed of activated charcoal or other absorbent material to adsorb the gasoline vapors, which then would be desorbed and returned to the carburetor upon restarting of the engine. However, it has been found that the desorption of the gasoline upsets the desired air to fuel ratio within the engine and results in an over-rich mixture which, in turn, results in irregular and poor engine performance.

In order to avoid the objection of an over-rich air-fuel mixture, it has been proposed to form a composite of the adsorbent in a matrix such as foamed plastic material. It appears that such a composite permits controlled desorption of the gasoline and avoids the over-rich mixture upon restarting of the engine. However, some difficulty is experienced in forming satisfactory composites of adsorbent and matrix.

DESCRIPTION OF THE INVENTION

It is believed that the difficulties encountered in preparing satisfactory composites of adsorbent and matrix are due to several reasons. For example, in preparing polyurethane foam in contact with carbon, it is believed that the carbon reacts with or adsorbs some of the ingredients of the polyurethane formulation and interferes with the foaming step. Also some difficulty may be due to the polyurethane encapsulating the carbon particles and thereby preventing adsorption of the gasoline vapors by the carbon. These objections are avoided by the novel method of the present invention.

In one embodiment the present invention relates to an adsorbent composite of solid adsorbent and matrix prepared by precoating said adsorbent with an inert removable shielding liquid, thereafter uniformly distributing the precoated adsorbent in a matrix, and subsequently removing said shielding liquid from the composite.

In a specific embodiment the present invention relates to an evaporative emission control composite of activated carbon granules and polyurethane foam prepared by precoating said carbon granules with an aromatic or cycloaliphatic hydrocarbon, separately preparing a polyurethane formulation in a mold, adding said precoated carbon granules thereto with intimate mixing, foaming the polyurethane formulation, thereby forming a polyurethane foam containing said carbon granules uniformly distributed therein, and subsequently removing said hydrocarbon by heating the composite in vacuum.

In another specific embodiment the present invention relates to the method of preparing an evaporative emission control composite by the steps hereinbefore set forth.

Any suitable solid adsorbent may be used in the present invention. Activated carbon is particularly desirable and comprises a preferred adsorbent. Other solid adsorbents include molecular sieves, silica, fuller's earth, alumina, charcoal (especially that made from suitable nut shells or peach pits), etc. The solid adsorbent preferably is in the form of finely divided particles of suitable size and shape. In general the particles may be in the range of from about 4 to about 30 and preferably from about 8 to about 20 mesh size. These particles may be of uniform or irregular size and shape. The preparation of such particles is well known in the art and need not be described in detail herein.

As hereinbefore set forth, the adsorbent particles are precoated with an inert removable shielding liquid. Any suitable shielding liquid may be used. In a preferred embodiment the shielding liquid comprises a hydrocarbon and particularly an aromatic or cycloaliphatic hydrocarbon. Illustrative aromatic hydrocarbons include benzene, toluene, xylene, ethylbenzene, diethylbenzene, propylbenzene, dipropylbenzene, butylbenzene, etc., as well as polycyclic aromatic compounds as, for example, naphthalene, alkyl-substituted naphthalene, and other suitable polycyclic aromatic hydrocarbons. Illustrative cycloaliphatic hydrocarbons include cyclopentane, methylcyclopentane, dimethylcyclopentane, ethylcyclopentane, diethylcyclopentane, propylcyclopentane, dipropylcyclopentane, cyclohexane, methylcyclohexane, dimethylcyclohexane, trimethylcyclohexane, ethylcyclohexane, diethylcyclohexane, triethylcyclohexane, propylcyclohexane, dipropylcyclohexane, cycloheptane, methylcycloheptane, dimethylcycloheptane, trimethylcycloheptane, ethylcycloheptane, diethylcycloheptane, propylcycloheptane, cyclooctane, methylcyclooctane, dimethylcyclooctane, trimethylcyclooctane, ethylcyclooctane, diethylcyclooctane, propylcyclooctane, cyclononane, methylcyclononane, dimethylcyclononane, trimethylcyclononane, ethylcyclonoane, diethylcyclononane, propylcyclononane, cyclodecane, methylcyclodecane, dimethylcyclodecane, trimethylcyclodecane, ethylcyclodecane, diethylcyclodecane, cycloundecane, methylcycloundecane, dimethylcycloundecane, trimethylcycloundecane, ethylcycloundecane, propylcycloundecane, cyclododecane, methylcyclododecane, dimethylcyclododecane, trimethylcyclododecane, ethylcyclododecane, propylcyclododecane, etc., as well as polycyclic compounds including Decalin (decahydronaphthalene), Tetralin, etc. In another embodiment the shielding liquid is an aliphatic hydrocarbon and may comprise hexane, heptane, octane, nonane, decane, undecane, dodecane, etc., which may be straight or branched chain.

In still another embodiment the shielding liquid comprises a halocarbon compound and particularly the hydrocarbon hereinbefore set forth substituted with one or more fluorine atoms. Illustrative examples include the halogenated hydrocarbons available as Freons and particularly the higher boiling mixed halocarbons as, for example, 1,2-difluro-1,2-tetrachloroethane.

It is understood that the particular shielding liquid will be selected with reference to its compatibility with the plastic formulation and with its ability to be removed from the composite. It is apparent that the selection will depend upon the particular plastic formulation employed in order that the shielding liquid will be inert during preparation of the composite. Also, the shielding liquid must be satisfactory to provide a protective shield on the absorbent particles and, as hereinbefore set forth, is subsequently readily removed from the composite.

Preparation of the composite of precoated adsorbent particles and matrix is effected in any suitable manner and generally at room temperature, although slightly elevated temperature, which usually will not exceed 65° C. may be used. One convenient method is to partly prepare the plastic component and then add the precoated adsorbent particles thereto, followed by intimate mixing and completion of the plastic formation. The mixing preferably is kept to a minimum in order to avoid entrapment of air in the composite. Satisfactory polyurethane foam containing the precoated uniformly distributed therein have been prepared by partial preparation of polyurethane foam, addition of precoated carbon particles, followed by intimate stirring and completion of the foaming step. The carbon particles may be added at a temperature of from about 30° C. to about 70° C. and preferably at 40° C. to 50° C. It is understood that any suitable method of preparing the composite of adsorbent and matrix may be used.

The precoated adsorbent particles are evenly distributed in a matrix. The matrix will be selected to provide a porous body and, in a preferred embodiment of the invention, comprises a plastic foam. A particularly preferred embodiment comprises open cell polyurethane foam. In general the polyurethane foam is prepared by reacting an isocyanate with a polyol. Here again the preparation of polyurethane foam is known in the prior art and need not be described here in detail. Examples appended to the present specifications illustrate specific formulations. However, it is understood that any suitable polyurethane foam may be used in accordance with the present invention.

While polyurethane foam is particularly preferred, other plastic foams may be used including polystyrene foam, phenolic, polyvinyl chloride, urea, formaldehyde, acrylonitrile, styrene, polyethylene, polypropylene, epoxides, etc. Here again the preparation of the foamed product is well known and need not be described here in detail.

While plastic foam is preferred for use as the matrix, it is understood that suitable resin or rigid plastic may be used. However, as hereinbefore set forth, it is essential that the matrix is sufficiently porous to permit penetration therethrough of the gasoline vapors for adsorption by the carbon particles.

Following the foaming step, the composite is cured. This generally is effected by heating at a temperature of from about 90° C. to about 100° C. although lower or higher temperatures may be used. During the curing step, some of the shielding liquid is removed. The remaining shielding liquid then is removed in any suitable manner and conveniently by heating the mixture in vacuum at a temperature from about 110° C. to about 150° C., although lower or higher temperatures may be used. In order to avoid decomposition or other deterioration of the composite, the heating should be done at as low a temperature as satisfactory and thus preefrably is effected under vacuum. Similarly the time of heating will be sufficient to effect substantially complete removal of the shielding liquid and may range from about 1 to about 24 hours or more and preferably from about 4 to about 20 hours. The exact temperature and time of heating will be selected in order to reduce the weight of the composite to the theoretical weight, which is known by the weights of the adsorbent and matrix ingredients charged to the process.

The shielding liquid will be used in sufficient amount to coat the adsorbent particles. In one method, the shielding liquid is added in just a sufficient amount wet to carbon particles. It is noted that the surface of the shielded carbon is shiny as compared to the original dull appearance. The amount will vary with different shielding liquids and adsorbents but generally the shielding liquid will be used in the amount of from about ½ to about twice the weight of the adsorbent. When an excess of shielding liquid is used, the excess liquid may be drained, filtered or otherwise removed from the composite.

It is preferred to use as much adsorbent in the composite as practical. As will be demonstrated by the appended examples, satisfactory composites have been prepared containing more than 50% by weight of carbon. Here again, the particular composite will vary with the specific adsorbent and matrix utilized, but generally the composite will comprise from about 50% to about 70% by weight of the adsorbent.

In one embodiment the composite may be formed in a mold of the desired size and shape as, for example, ring shaped to fit conventional air filters and wide enough to replace the air filter or of narrower width to be used in conjunction with a conventional or modified air filter. In another method, the composite is formed in a mold of larger size than desired and the composite then is cut into the desired size and shape. In one method the composite is encased in suitable supporting means as, for example, wire mesh, fiberglass cloth or other suitable screening material.

As hereinbefore set forth the composite of the present invention is particularly useful for adsorbing gasoline vapors from the carburetor bowl and/or fuel tank. Accordingly, the composite is disposed in a suitable cannister, which may be a conventional air filter, and arranged to receive the vapors from the carburetor and/or fuel tank. In a preferred method, the composite is disposed in such a manner that the evaporated fuel from the carburetor and/or fuel tank must pass through the composite before exhausting into the atmosphere. In another embodiment the arrangement may comprise passing a portion of the escaping vapors through the composite. In either method, the air intake is arranged to pass through the composite and to desorb the fuel entrained therein, thus reducing air pollution and also improving gasoline economy by recovery and reuse of the fuel.

As hereinbefore set forth, the use of the composite of adsorbent and matrix permits high adsorption of evaporative emissions and controlled desorption thereof, which does not result in an over-rich fuel-air mixture. As another advantage to the present invention, removal of the shielding liquid serves to increase the porosity of the composite and thereby to facilitate adsorption of the escaping vapors.

While the absorbent composite of the present invention is especially useful to adsorb gasoline vapors as hereinbefore set forth, it is understood that the adsorbent composite may be used in any system in which solid adsorbents are employed. As hereinbefore set forth, the adsorbent composite of the present invention offers the advantage of minimizing attrition of the adsorbent particles, improved porosity, miminizing channeling in and plugging of the contact chambers, minimizing excessive back pressure, etc. The feed to the adsorbent composite may be in liquid or vapor state. The adsorption process may comprise one or more beds of adsorbent composite in one contact chamber and/or the use of two or more contact chambers, with either series or parallel flow therethrough. Generally, at least two contact chambers containing the adsorbent composite are employed, with one or more chambers being utilized in the adsorption cycle and the other contact chamber or chambers undergoing desorption. For example, phenol may be recovered from a phenol stream containing impurities by adsorption in one zone until the adsorbent is saturated, after which a desorbent is passed through the adsorbent to desorb the phenol. It is understood that any suitable desorbent may be employed, which again may be in a liquid or vapor state. These methods of operation are well known in the art and need not be described in detail herein.

The following examples are introduced to illustrate further the novelty and utility of the present invention but not with the intention of unduly limiting the same.

EXAMPLE I

The composite of this example was prepared by wetting 150 g. of activated carbon granules of 12 to 30 mesh size with 113 g. of Decalin. The polyurethane foam was of the following recipe.

TABLE I

| Ingredient: | Grams |
|---|---|
| Polyol (Witco G-3530) | 100 |
| Polymeric silicone surfactant L-520 | 1.0 |
| Tin octoate (T-9) | 1.2 |
| Triethylenediamine catalyst | 1.2 |
| Water | 2.9 |
| Toluene diisocyanate | 37.5 |

The composite was prepared by first mixing the polyol, tin octoate and silicone at room temperature. The triethylenediamine is dissolved in the water and added to the polyol solution, followed by stirring for about 4 seconds. Then the toluene diisocyanate was added and the mix was stirred for an additional 4 seconds. The precoated carbon particles at a temperature of about 43° C. then were added, and the mixture was stirred for 15–20 seconds to complete the foaming. As hereinbefore set forth, the stirring should be kept to a minimum because excessive stirring may cause air entrapment and also enhance collapse of the foam. However, partial collapse of the foam may be acceptable but understandably should not be excessive. The composite was cured by heating at 90–100° C. and then at 115° C. under 25 mm. Hg for 16 hours to remove remaining Decalin.

The composite prepared in the above manner was of good foam containing the carbon uniformly distributed therein.

EXAMPLE II

Another satisfactory composite was prepared in substantially the same manner as described in Example I, except that the tin octoate was used in the concentration of 2.4 g. In this preparation 300 g. of the activated carbon granules were precoated with 205 g. of Decalin.

EXAMPLE III

An additional composite was made in essentially the same manner as described in the previous examples. However, there was partial collapse of the foam but, as will be shown in a subsequent example, the partially collapsed composite was effective in adsorbing gasoline vapors.

EXAMPLE IV

Another composite was prepared in substantially the same manner as hereinbefore described but using xylene as the shielding liquid. The formulation also contained dimethyl ethanolamine as catalyst to promote the diisocyanate-water reaction. The composite underwent partial collapse but, as hereinbefore set forth, is effective for the purpose.

EXAMPLE V

Another composite is prepared in substantially the same manner as hereinbefore described but using n-octane as the shielding liquid. In place of toluene diisocyanate, diphenylmethane diisocyanate is used.

EXAMPLE VI

The adsorbent properties of the composite were evaluated as follows. After the foams were cured at 90–100° C. 1" x 2" x 2" samples were cut from blocks and then the samples were stripped of solvent in a vacuo oven at 115° C. under 25 mm. Hg for 6–18 hours. The samples then were weighed to the fourth decimal place and immediately placed in a desiccator containing water. This was done to simulate 100% humidity at a temperature of 25° C. The samples then were weighed at 2, 4 and 24 hours. The weight gain was calculated and recorded as grams of water gained per 100 cubic inches of foam. Immediately after the 24 hour weighing for water adsorption, the samples were transferred to a desiccator containing 250 cc. (180 g.) of Indolene which was used as the gasoline species. The above weighing procedure was repeated and the weight gain was calculated as grams of gasoline per 100 cubic inches of foam based on the weight of the sample after the 24 hour 100% humidity exposure.

The following table reports the results of the above evaluations when using the composites prepared in accordance with Examples II, III and IV. For comparative purposes, the following table also reports the results when using the carbon particles alone, as well as when using the foam alone and also when using a composite of carbon and foam prepared without a shielding liquid.

TABLE II

| | Grams adsorbed/100 in.³ | | | | | |
|---|---|---|---|---|---|---|
| | Water, hours | | | Indolene, hours | | |
| Sample | 2 | 4 | 24 | 2 | 4 | 24 |
| Carbon only | 16.2 | 23.1 | 107.9 | 147.0 | 167.8 | 216.0 |
| Polyurethane foam only | 1.1 | 1.0 | 0.99 | 3.1 | 3.6 | 7.0 |
| Carbon-foam but no shielding liquid | 10.4 | 16.2 | 31.4 | 7.5 | 11.3 | 27.5 |
| Composite of Example— | | | | | | |
| II | 7.2 | 9.9 | 19.2 | 16.5 | 21.0 | 40.0 |
| III | 12.7 | 15.0 | 32.2 | 28.6 | 36.3 | 67.6 |
| IV | 7.84 | 10.37 | 36.92 | 30.40 | 40.02 | 73.15 |

From the data of the above table it will be seen that the carbon by itself was a very effective adsorbent. On the other hand, the polyurethane foam by itself was a poor adsorbent. The composite prepared in the absence of the shielding liquid was an effective adsorbent. The composite prepared according to Examples II, III and IV were of even greater effectiveness and, as hereinbefore set forth, may be explained on the basis of increased porosity resulting from the stripping of the shielding liquid.

EXAMPLE VII

As hereinbefore set forth, another important requirement is that the adsorbed fuel is desorbed at a controlled rate in order not to produce an over-rich fuel-air mixture upon restarting the engine. This was evaluated in a dynamometer operating through a series of acceleration, cruising and deacceleration cycles of from 20 to 50 m.p.h. for a time of 42 minutes, following which the engine was stopped and restarted after a 20 minute wait. A conventional air filter was modified to omit the center hump. In the evaluations made in the above manner with the modified air filter, the average of four restart times was 2.75 seconds. In a similar evaluation but utilizing a composite prepared in substantially the same manner as described in Example II in place of the conventional air filters, the average of four hot restart times was 2.20 seconds. This is a considerable reduction and may be the difference between satisfactory and unsatisfactory engine performance.

I claim as my invention:

1. A method of preparing an adsorbent composite of solid adsorbent and matrix which comprises precoating an adsorbent selected from the group consisting of activated carbon, molecular seives, silica, fuller's earth, alumina and charcoal with an inert removable hydrocarbon monomer shielding liquid, uniformly distributing the precoated adsorbent in a matrix of plastic foam to form a mixture consisting essentially of said precoated adsorbent and plastic foam and subsequently removing said shielding liquid from the composite.

2. The method of claim 1 in which said adsorbent is activated carbon particles.

3. The method of claim 1 in which said matrix is polyurethane foam.

4. The method of claim 1 in which said shielding liquid is an aliphatic hydrocarbon.

5. The method of claim 1 in which said shielding liquid is an aromatic hydrocarbon.

6. The method of claim 1 in which said shielding liquid is a cycloaliphatic hydrocarbon.

7. The method of claim 6 in which said cycloaliphatic hydrocarbon is decahydro-naphthalene.

8. The method of claim 1 which comprises preparing a plastic foam formulation, adding the precoated adsorbent thereto with intimate mixing, foaming the plastic formulation, curing the foamed plastic, and thereafter removing the shielding liquid.

9. The method of claim 1 which comprises preparing a polyurethane formulation, adding precoated carbon granules thereto with intimate mixing, foaming the polyurethane formulation, curing the foamed composite, and thereafter removing the shielding liquid by heating in vacuum.

References Cited

UNITED STATES PATENTS

| Re. 25,400 | 6/1963 | Dowing | 252—428 |
| 3,396,123 | 8/1968 | Urban | 252—428 |
| 1,966,553 | 7/1934 | Kropp | 252—426 |

FOREIGN PATENTS

| 1,248,197 | 8/1967 | Germany. |
| 741,782 | 8/1966 | Canada. |

HELEN M. S. SNEED, Primary Examiner

U.S. Cl. X.R.

252—426, 444